US012726336B2

(12) United States Patent
Chhodavdia et al.

(10) Patent No.: US 12,726,336 B2
(45) Date of Patent: Sep. 1, 2026

(54) SECURE KEY EXCHANGE USING KEY-ASSOCIATED ATTRIBUTES

(71) Applicant: Microsoft Technology Licensing, LLC, Redmond, WA (US)

(72) Inventors: Avdhesh Chhodavdia, Fremont, CA (US); Ling Tony Chen, Bellevue, WA (US); Felix Stefan Domke, Lubeck (DE); Kambiz Rahimi, Kirkland, WA (US); Jay Scott Fuller, Scotts Valley, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 187 days.

(21) Appl. No.: 18/168,476

(22) Filed: Feb. 13, 2023

(65) Prior Publication Data

US 2023/0198746 A1 Jun. 22, 2023

Related U.S. Application Data

(63) Continuation of application No. 17/081,577, filed on Oct. 27, 2020, now Pat. No. 11,595,189.

(51) Int. Cl.
*H04L 9/08* (2006.01)

(52) U.S. Cl.
CPC .......... *H04L 9/0819* (2013.01); *H04L 9/0841* (2013.01); *H04L 9/0869* (2013.01)

(58) Field of Classification Search
None
See application file for complete search history.

(56) References Cited

U.S. PATENT DOCUMENTS 11,088,835 B1 * 8/2021 Wilbur ...................... H04L 9/14
2015/0163675 A1 * 6/2015 Chang ..................... H04W 4/12 455/411
2015/0288517 A1 * 10/2015 Evans .................. H04L 9/0852 713/168

(Continued)

FOREIGN PATENT DOCUMENTS

WO WO-2013091840 A1 * 6/2013 ............. G06F 21/35
WO WO-2019147279 A1 * 8/2019 ........... G06F 21/575

OTHER PUBLICATIONS

Summons to attend oral proceedings received for European Application No. 19703530.6, mailed on May 21, 2024, 7 pages.

(Continued)

*Primary Examiner* — Benjamin E Lanier

(57) ABSTRACT

A method for secure key exchange. The method comprises receiving a request to certify a key from a communication partner at an interface between an access and tamper resistant circuit block and exposed circuitry. Within the access and tamper resistant circuit block, a first random private key is generated. A corresponding public key of the first random private key is derived, and a cryptographic digest of the public key and attributes associated with the first random private key is generated. The generated cryptographic digest is signed using a second random private key that has been designated for signing by one or more associated attributes. The public key and the signature are then sent to the communication partner via the interface.

20 Claims, 9 Drawing Sheets

(56) References Cited

U.S. PATENT DOCUMENTS

| | | | | |
|---|---|---|---|---|
| 2019/0068566 | A1 * | 2/2019 | Gandhi | H04L 63/0876 |
| 2019/0245686 | A1 * | 8/2019 | Rahimi | G06F 21/72 |

OTHER PUBLICATIONS

Communication under Rule 71(3) EPC Received for European Application No. 21755656.2, mailed on Apr. 10, 2026, 8 pages.

Extended European Search Report received for EP Application No. 26166445.2, mailed on Jun. 18, 2026, 10 Pages.

* cited by examiner

COMMANDS, DATA, RESULTS

EXPOSED CIRCUITRY 102

INTERFACE 103

ACCESS & TAMPER RESISTANT CIRCUITRY 101

NONVOLATILE MEMORY 111

PROCESSING CIRCUITRY 110

VOLATILE MEMORY 112

CRYPTOGRAPHIC KEY REGISTERS 130

KEY #1 131a

ATTRIBUTES #1 131b

131

KEY #2 132a

ATTRIBUTES #2 132b

132

KEY #3 133a

ATTRIBUTES #3 133b

133

KEY #4 134a

ATTRIBUTES #4 134b

134

KEY #N 135a

ATTRIBUTES #N 135B

135

PCR REGISTERS 120

PCR #1 121

IV #1 125

PCR #2 122

IV #2 126

PCR #3 123

IV #3 127

PCR #M 124

IV #M 128

200

COMMAND(S) 250

EXPOSED CIRCUITRY 202

INTERFACE 203

ACCESS & TAMPER RESISTANT CIRCUITRY 201

231b

ATR #N 231b-6

ATR #N 231b-6

ATR #N 231b-6

ATR #N 231b-6

ATR #N 231b-6

ATR #N 231b-6

ATR #N 231b-6

ENCRYPTED CRYPTOGRAPHIC KEY 251

UNENCRYPTED ATTRIBUTES 241

ATTRIBUTE(S) 240

PROCESSING CIRCUITRY 210

231

CRYPTOGRAPHIC KEY PORTION 231a

CRYPTOGRAPHIC KEY 235

400

405
AT AN INTERFACE BETWEEN AN ACCESS AND TAMPER RESISTANT CIRCUIT BLOCK AND EXPOSED CIRCUITRY

410
RECEIVE A REQUEST TO CERTIFY A KEY FROM A COMMUNICATION PARTNER

415
WITHIN THE ACCESS AND TAMPER RESISTANT CIRCUIT BLOCK

420
GENERATE A FIRST RANDOM PRIVATE KEY

425
DERIVE A CORRESPONDING PUBLIC KEY OF THE FIRST RANDOM PRIVATE KEY

430
GENERATE A CRYPTOGRAPHIC DIGEST OF THE PUBLIC KEY AND ATTRIBUTES ASSOCIATED WITH THE FIRST RANDOM PRIVATE KEY

435
USING A SECOND RANDOM PRIVATE KEY, THE SECOND RANDOM PRIVATE KEY DESIGNATED FOR SIGNING BY ONE OR MORE ASSOCIATED ATTRIBUTES, SIGN THE GENERATED CRYPTOGRAPHIC DIGEST

440
SEND THE PUBLIC KEY AND THE SIGNED DIGEST TO THE COMMUNICATION PARTNER VIA THE INTERFACE

445
RESPONSIVE TO SENDING THE PUBLIC KEY AND THE SIGNATURE TO THE COMMUNICATION PARTNER CLEARING THE ATTRIBUTES ASSOCIATED WITH THE FIRST RANDOM PRIVATE KEY THAT INDICATE THAT THE FIRST RANDOM PRIVATE KEY IS EPHEMERAL

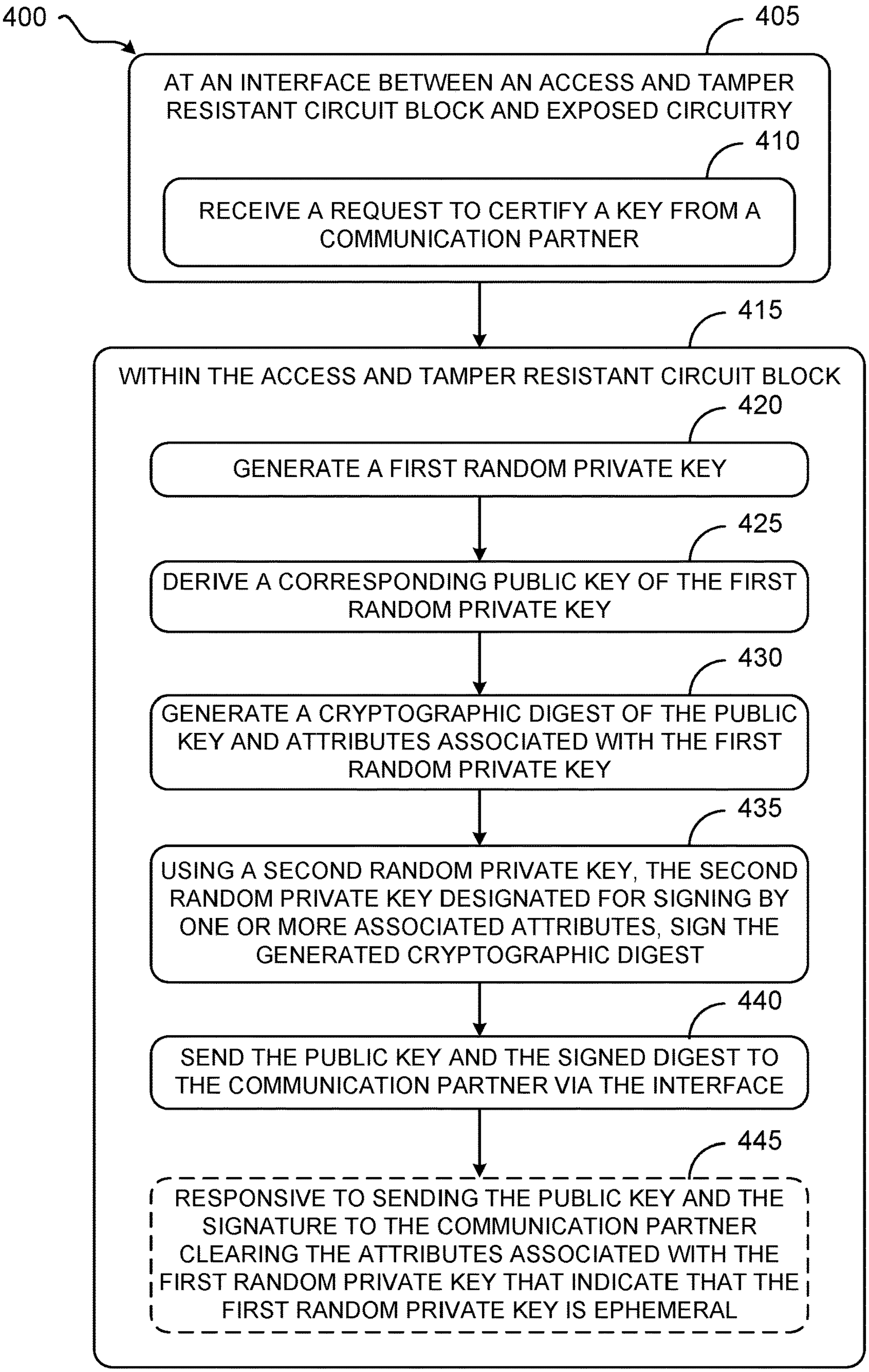

COMMAND(S) 260

DATA 261

INTERFACE 203

EXPOSED CIRCUITRY 202

ACCESS & TAMPER RESISTANT CIRCUITRY 201

PROCESSING CIRCUITRY 210

PCR VALUE GENERATION CIRCUITRY 275

PCR REGISTER 280

PCR REGISTER READ VALUE 281

PCR REGISTER WRITE VALUE 282

SECURE KEY EXCHANGE USING KEY-ASSOCIATED ATTRIBUTES

CROSS REFERENCE TO RELATED APPLICATIONS

This application is a continuation of U.S. patent application Ser. No. 17/081,577, filed Oct. 27, 2020, the entirety of which is hereby incorporated herein by reference for all purposes.

BACKGROUND

Modern computing devices rely on secure means of exchanging information with other computing devices. In particular, users assume security for financial transactions, identity-based transactions, subscription services, etc. Each new mechanism for securing information provides a new opportunity for intentional security breaches. Often, these breaches are initiated using techniques that introduce malicious software that subverts one or more security measures taken by the device's makers. Measures for preventing such breaches are therefore increasingly important.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Examples are disclosed that relate to secure key management. One example comprises receiving a request to certify a key from a communication partner at an interface between an access and tamper resistant circuit block and exposed circuitry. Within the access and tamper resistant circuit block, a first random private key is generated. A corresponding public key of the first random private key is derived, and a cryptographic digest of the public key and attributes associated with the first random private key is generated. The generated cryptographic digest is signed using a second random private key that has been designated for signing by one or more associated attributes. The public key and the signature are then sent to the communication partner via the interface.

Another example comprises receiving a request for a combined authorization key. Based on the received request, two or more keys are retrieved along with associated attributes for each retrieved key from the hardware enforced key register. Using a mixing algorithm, the two or more retrieved keys and their associated attributes are combined to generate the combined authorization key and associated attributes. The combined key and associated attributes are then stored in the hardware key register.

In a further example, a system comprises an access and tamper resistant circuit block, including an interface to exposed circuitry, a plurality of keys stored in a hardware key register, each key associated with a plurality of attributes, and processing circuitry. The processing circuitry is configured to receive, at the interface, a request for authorization based on a first key of the plurality of keys. Based on the plurality of attributes associated with the first key, the processing circuitry determines whether the first key can be modded by a one-way function for use outside the access and tamper resistant circuit block. Based on determining that the first key can be modded by a one-way function for use outside the access and tamper resistant circuit block, the processing circuitry performs a mod function to generate a sharable output. The sharable output is then exported via the interface.

BRIEF DESCRIPTION OF THE DRAWINGS

FIG. 4 shows an example method for secure key exchange.

DETAILED DESCRIPTION

Figure 1:
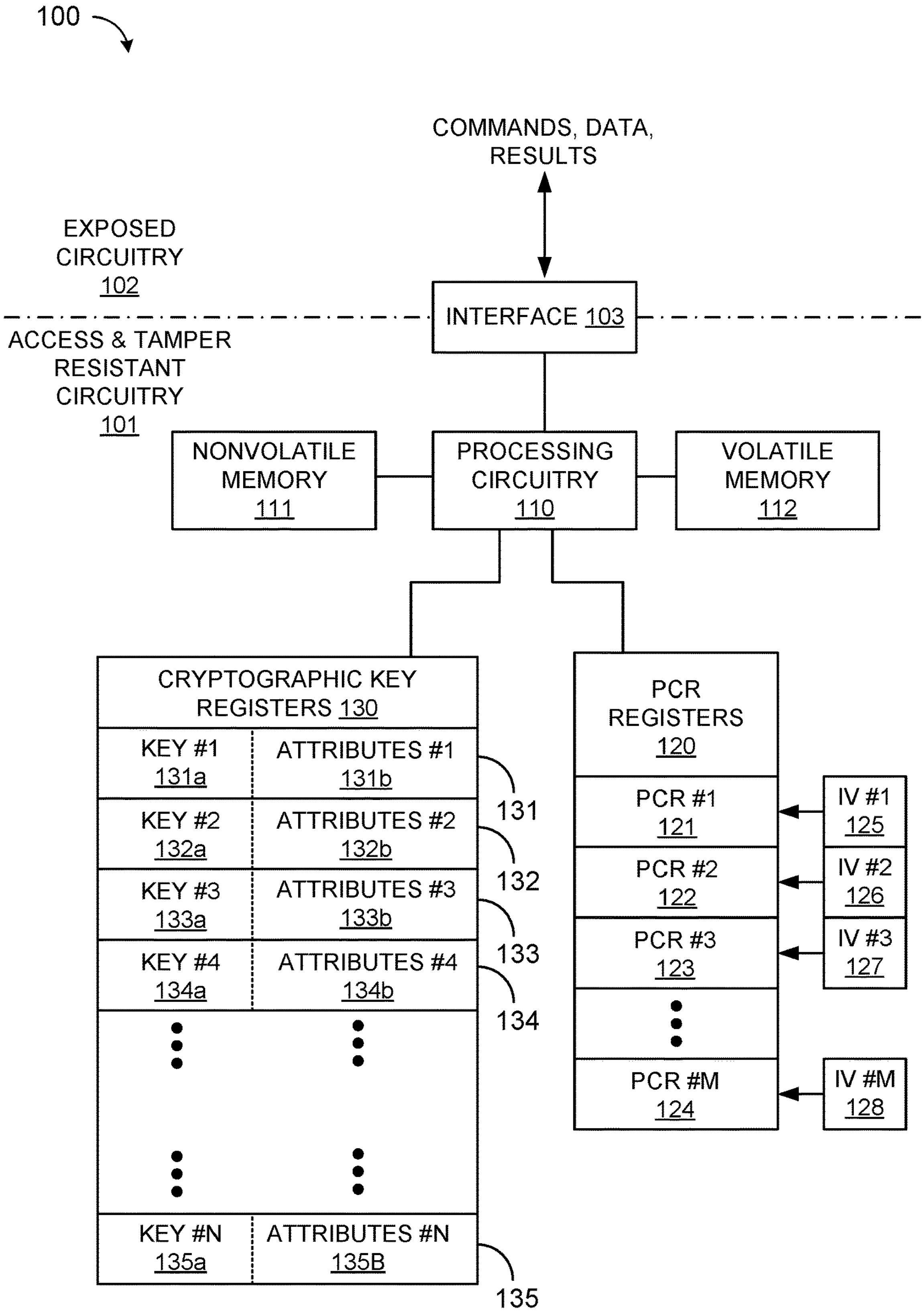
FIG. 1 schematically shows a cryptographic key management system comprising key attributes.

Cryptography is increasingly used to protect digital assets and communications. As such, vulnerabilities in modern computing systems are at risk to malicious attacks. The rapidly growing sophistication of cyber-attacks requires equally, if not more sophisticated means of storing, processing, and managing cryptographic keys. Even a single compromised key could lead to a considerable data breach with consequences for both users and service providers.

Cryptographic keys are now embedded into nearly all digital systems and applications. These keys, including symmetric keys, private keys, and hash keys, are protected by sophisticated management systems to prevent data breaches. Keys that are reused, used incorrectly, overused, stored improperly, or otherwise exposed to non-secure environments pose a risk to device and application security. However, while cryptographic keys may be stored in a secure environment, eventually they will be used, either internally or externally, in order to underwrite secure communications and transactions.

There are various hardware-based key-vault systems capable of storing keys securely so that the keys cannot be extracted. However, many allow the associated firmware to use the key for any purpose. As one solution, a set of cryptographic keys and an associated set of attributes (key attributes) may be stored in hardware within an access and tamper resistant (ATR) circuit block. Software may be granted oracle access to keys and may use them in cryptographic operations performed by hardware. Operations on these keys is provided only through a limited function hardware interface such that the key values themselves are never exposed outside of the ATR circuitry. Further, the operations that can be performed on these keys are determined and encoded by associated key attributes. Only such designated operations can only be performed by the ATR circuitry. The key attributes can only be modified/set by the ATR block at key generation or derivation time—thereby preventing software access to the keys and limiting unintended usage or conversion of the keys (e.g., to a new use) via software.

Because keys are often derived from a key derivation function (KDF), the attributes of the destination key may also be used to generate the key itself. This process locks in the key attributes, and prevents malicious representation of the key attributes. So, even if the firmware becomes malicious, it cannot take over the keys for uses outside of what was initially established by the original key creator—the firmware can only follow the rules specified at key creation.

As new cryptographic challenges arise, new key attributes and hardware encoded functions can be derived to provide solutions to these challenges. For example, it may be desired for a hardware encoded key to be used outside of the ATR circuitry without exposing the actual key values. Also, in some scenarios, multiple keys may be needed to verify or authenticate credentials outside the ATR circuitry. Further, publicly available values stored within the ATR circuitry may need to be exposed without compromising other stored values.

Accordingly, examples are disclosed that relate to systems and methods for key management that may help to address these issues, among others. In one example, secure communication channels may be established using attribute-based private keys, including hardware-isolated ephemeral keys. In another example, two or more keys may be used to derive a unique key that certifies that the parent keys are stored within the hardware-encrypted key register. In a further example, one-way operations, such as hash operations, are used to generate software-readable keys from hardware-encoded keys so that the hardware-encoded keys are not derivable in reverse. Additionally, platform configuration registers may be established so that both dynamic and static measurements may be stored at one register, using unique (among other platform configuration registers) initialization and reinitialization values for each register.

FIG. 1 is a schematic of a cryptographic key management system with key attributes. In FIG. 1, cryptographic key management system 100 comprises access and tamper resistant (ATR) circuitry 101, exposed circuitry 102, and interface 103. Interface 103 may be configured as the only information bridge between exposed circuitry 102 and ATR circuitry 101. Thus, all access to pass commands, data, and/or results to or from ATR circuitry 101 passes through interface 103.

ATR circuitry 101 includes cryptographic processing circuitry 110, nonvolatile memory 111, volatile memory 112, cryptographic key registers 130, and platform configuration registers (PCRs) 120. ATR circuitry may be implemented as hardware. For example, such hardware may include a hardware state machine, or may be an isolated mini processor core that includes firmware component inside it.

Cryptographic key registers 130 includes N number of key registers 131-135, where Nis an integer. PCRs 120 include M number of PCR registers 120-124, where Mis an integer. Each key register 131-135 includes two portions: a key portion 131*a*-135*a* and an attribute portion 131*b*-135*b*, respectively. Each PCR register 121-124 is initialized to a unique, among other PCR registers 121-125, initial value 125-128, respectively.

ATR circuitry 101 uses key registers 130 to hold cryptographic keys in key portions 131*a*-135*a* and associated key attributes in attribute portions 131*b*-135*b*. PCRs 120 hold measurements. The N number of key registers 130, (a.k.a., key slots) and M number of PCRs 120 in ATR circuitry 101 is implementation defined. In one example, a minimum of 16 key registers and 4 PCRs are defined. In other examples, other numbers of key registers and PCRs may be used. Each key portion 131*a*-135*a* may be, for example, 256 bits or 384 bits wide, or may have any other suitable width. Each attribute portion may be, for example, an additional 24 or 32 bits wide, or may have any other suitable width. PCR registers 120 may be, for example, 256 bits or 384 bits wide. The key stored in a key register may be, for example, an Advanced Encryption Standard (AES) key (either 128, 192 or 256-bit), or an Elliptic-curve cryptography (ECC) private key (e.g., an ECC key that conforms to the National Institute of Standards and Technology (NIST) P-256—or other standardized/unstandardized ECC curves, such as Elliptic Curve Diffie Hellman (ECDH).) The type of key held in a key register 131-135 is specified by the values in its attribute portion 131*b*-135*b*. The values in the attribute portions 131*b*-135*b* also control what type of operation can be performed on, or by, the key stored in the associated key portion 131*a*-135*a*.

These operations can include, for example, the ability to performing AES encryption/decryption using the stored key, the applying of a KDF to the stored key to derive another stored key, and using the stored key to decrypt and "load" a cryptographic key blob containing a key and associated attribute into another key register 131-135.

The combination of KDF and load operations, for example, allows a chain of cryptographic keys to be distributed. These operations enable, for example, the ability to distribute keys from servers (such as an online gaming service server or other content service server) to client devices including cryptographic key management system 100. These distributed keys may be used, for example, to decrypt games, music, movies, etc., as well as other useful applications, without exposing the unencrypted version of these key outside of ATC circuitry 101.

In some examples, attribute portions 131*b*-135*b* of key registers 130 are 32 bits wide. In other examples, the attribute portions may have any other suitable width. The values in attribute portions (a.k.a. attribute fields) 131*b*-135*b* define the operations that processing circuitry 110 can perform on, or using, the key stored in the associated key portion (a.k.a. key field) 131*a*-135*a*. Processing circuitry 110 maintains the association between the key and its associated attributes such that the attributes follow the key and are not changed outside of ATR circuitry 101. Accordingly, the rules for setting the attributes are enforced by ATR circuitry 101. In some examples, however, attribute values may be read by exposed circuitry, via interface 103, in unencrypted form.

ATR circuitry 101, and processing circuitry 110, may perform various cryptographic operations using keys stored in key portions 131*a*-135*a* and corresponding attributes stored in attribute portions 131*b*-135*b*. Attributes may include, but are not limited to, indications as to whether a key is unique and secret to the register, whether AES Encrypt or Decrypt operations are allowed on the key, whether AES 128 bit or AES 192 bit operations are allowed for the key, whether operations such as SendKey, LoadKey, DecryptLegacyKey, StoreKey, SaveKey, HMAC, and KDFKey are allowed for the key, whether the key may be operated on by a KDF operation with any PCR slot, whether the key may be used as an ECC Private Key for signing or exchange operations, whether an ECC Sign operation must include a PCR into the calculation of a digest for the key, whether the key slot includes a 256-bit or 384-bit key, and whether the key is Ephemeral, as examples.

Figure 2:
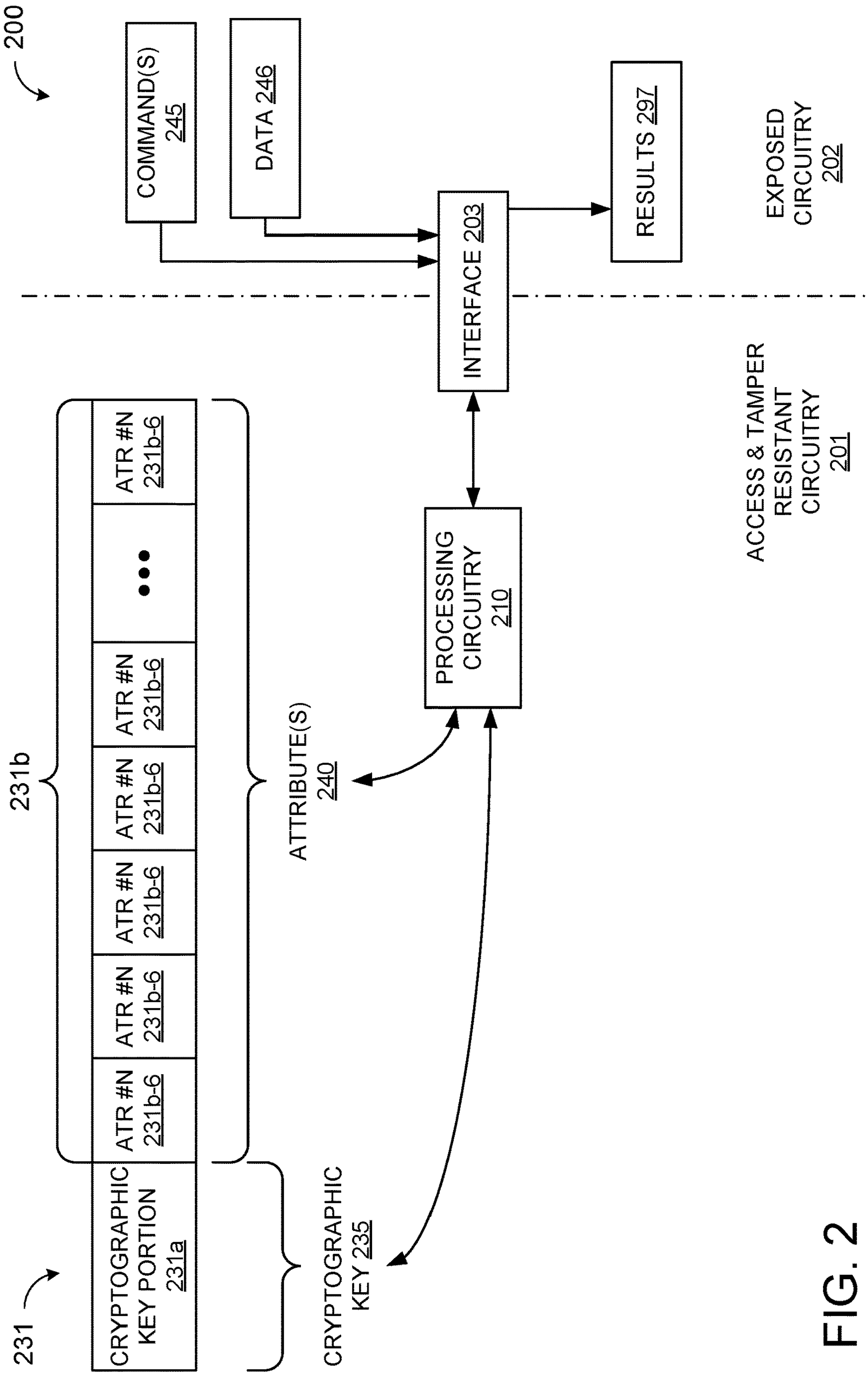
FIGS. 2-3 schematically show example operations that may be securely performed by a cryptographic key management system comprising key attributes.
Figure 3:
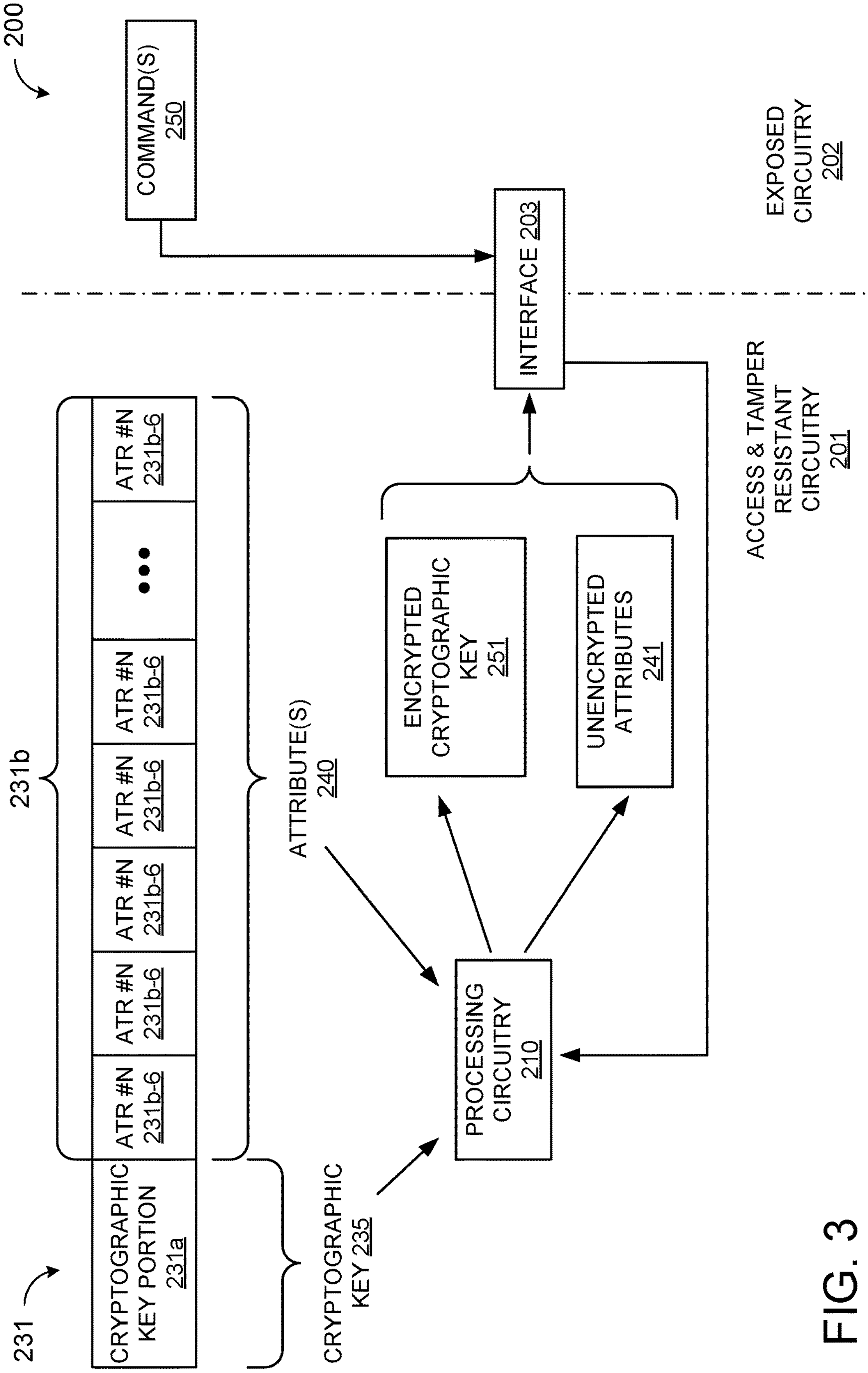

FIGS. 2 and 3 depict a cryptographic key management system 200 that includes ATR circuitry 201 coupled to exposed circuitry 202 via an interface 203. Cryptographic key management system 200 may be an example of cryptographic key management system 100. ATR circuitry 201 includes at least processing circuitry 210 and key register 231. Key register 231 includes key portion 231*a* and attribute portion 231*b*. Attribute portion 231*b* comprises at least N bits of storage (e.g., 231*b*-1 to 231*b*-6). Processing circuitry 210 may access and read key portion 231*a* to read and write a key 235. Processing circuitry 210 may access and read attribute portion 231*b* to read and write one or more attributes (a.k.a., attribute indicators) 240.

As illustrated notionally in FIG. 2, exposed circuitry 202 may provide one or more commands 245 (a.k.a., instructions) and/or data 246 to interface 203. Interface 203 may provide the one or more commands 245 and/or data 246 to processing circuitry 210 of ATR circuitry 201. Processing circuitry 210 may perform, based on one or more commands 245 and/or data 246 received from exposed circuitry 202 cryptographic operations based (at least in part) on cryptographic key 235 and attributes 240. Processing circuitry 210 may also provide the results (e.g., success, fail, encrypted cryptographic key blob, etc.) of commands 245 to exposed circuitry 202 via interface 230.

In some examples, the key portions of 131*a*-135*a* of key registers 130 are not readable, in response to commands received via interface 103, in unencrypted form. However, the attribute portions 131*b*-135*b* of the cryptographic key registers 130 may be readable, in unencrypted form, via interface 103 in response to commands received via the interface. This is illustrated notionally in FIG. 3.

In FIG. 3, one or more commands 250 are provided to interface 203 for provision to processing circuitry 210. In response, processing circuitry 210 reads key 235 and attributes 240 from key register 231. Processing circuitry 210 may provide an encrypted form 251 of cryptographic key 235 to interface 203 for provision to exposed circuitry 202. As an example, encrypted cryptographic key 251 may be generated by encrypting key 235 with some other key that is unique to this ATR 201. In another embodiment, encrypted cryptographic key 251 may be generated by encrypting key 235 along with attributes 240 and/or other information (e.g., a salt value.) The encryption key for generating encrypted cryptographic key 251 may be obtained from a key register (e.g., one of key registers 131-135.) Processing circuitry 210 may provide unencrypted attributes 241 to interface 203 for provision to exposed circuitry 202. Note that the key used to encrypt cryptographic key 235 may be preferentially unique to ATR 201 and is not available to exposed circuitry 202. If the key was set by exposed circuitry 202 and available to exposed circuitry 202, then exposed circuitry 202 would be able to decrypt encrypted cryptographic key 251 back to cryptographic key 235 which defeats the ability to keep any keys in ATR 201 secret.

Such a hardware encoded cryptographic system may use the attributes to enable extension of natively provisioned functions and allow for additional cryptographic algorithms that are software based to be mapped to hardware. The examples described herein allow for the implementation of cryptographic processes that are not natively supported but that do utilize keys that are protected within the hardware key registers without exposing these keys to the external software and/or firmware. In some examples, this may include deriving a new key from a previously generated and hardware protected key, and then exposing the derived key outside of the ATR circuit block. If the new key is derived by a one-way operation, the external entities are unable to obtain or generate any information about the hardware protected key.

Secure key exchange for hardware encoded private keys may necessitate encoded exchange of particular keys where the exchanged public keys are derived from the private keys, their associated attributes, and one or more PCR-stored values, but that cannot be directly linked back to the private keys. An example use scenario for this would be for a server to distribute a private key to a client device associated with the ATR circuitry if the user owning the device has a valid paid subscription. Since the user could stop paying for the subscription at any time, the server does not want the device to be able to persist the private key past a reboot, especially if the firmware controlling the ATR circuit block becomes compromised.

FIG. 4 depicts an example method 400 for secure key exchange. Method 400 may be performed by the processing circuitry of a cryptographic key management system with key attributes, such as processing circuitry 110 and 210, as examples. The cryptographic key management system, e.g., cryptographic key management systems 100 and 200, may include at least an access and tamper resistant (ATR) circuit block and an interface between the ATR circuit block and exposed circuitry. The cryptographic key management system may include a set of hardware key registers. The key registers may hold cryptographic key values and associated attributes. The cryptographic key values may not be readable by software, while the associated attributes may be readable by software.

At 405, method 400 includes actions that occur at the interface between the access and tamper resistant circuitry and the exposed circuitry. For example, at 410, method 400 includes receiving a request to certify a key from a communication partner, such as a request to validate that a subscription is current.

At 415, method 400 includes actions that occur within the access and tamper resistant circuitry. For example, at 420 method 400 includes generating a first random private key. In other examples, the first random private key may be previously generated and retrieved. At 425, method 400 includes deriving a corresponding public key of the first random private key. In some examples, the public key is an Elliptic Curve Diffie Hellman public key.

At 430, method 400 includes generating a cryptographic digest of the public key and attributes associated with the first random private key. For example, the attributes associated with the first random private key may indicate that the first random private key may be used to derive new values readable outside of the ATR circuitry. The digest may further be based on one or more values stored in a PCR. Additionally or alternatively, the attributes associated with the first random private key indicate that the first random private key can be used to derive new values readable outside of the ATR circuitry. Additionally or alternatively, the attributes associated with the first random private key may indicate that the first random private key is ephemeral.

For example, a server may wish to establish a secure communication channel with a client such that the encryption key for this channel cannot practically be recreated or discovered in the future. In such a scenario, even if one of the parties becomes compromised, their prior communications remain secure, even if they were recorded. This can be achieved if the private keys used by the parties to establish a shared secret are ephemeral.

In some examples, the parties may wish to use Elliptic Curve Diffie Hellman (ECDH), Rivest-Shamir-Adleman (RSA), or other cryptographic algorithms for establishing a shared secret. Using method 400, each party may choose a private key, generate the corresponding public key, and send it to the other party. However, each party needs to trust that the public key it receives is from an authentic partner and not from an intermediate adversary. As such, if the public keys are exchanged in advance or are authenticated by certificates issued by trusted authority, the private keys cannot be ephemeral.

At 435, method 400 includes, using a second random private key, the second random private key designated for signing by one or more associated attributes, signing the generated cryptographic digest. In some examples, the authenticity of the second random private key may be established by a certificate. As such, the second private key is established as a key that the verifier can trust. In some examples, attributes associated with the second random private key indicate that the second random private key is not ephemeral.

At 440, method 400 includes sending the public key and the signed generate cryptographic digest to the communication partner via the interface. The public key may be sent as part of a key exchange protocol. Concatenating the above steps together creates a way to certify a certain public key, so that the receiver can know that the corresponding private key is truly locked into hardware and has certain sets of verifiable attributes, which may include that the key is designated as ephemeral. The method ensures that the communication partner is prohibited from seeing intermediate results that are generated between the receipt of the request and the sending of the public key and the signature.

Hardware isolated ephemeral keys may be used for establishing a shared secret. To do this, a random private key may be generated, and its associated attributes set to designate it as ephemeral. The process of authenticating the ephemeral key may include generating a cryptographic digest of the public key corresponding to the private ephemeral key and the attributes of that key, along with other parameters that capture the state and identity of the system.

Upon receipt of the public key, the communication partner then forms the same digest from the public key and expected attributes and verifies the transmitted signature. This process authenticates the public key and gives assurance that it was computed from an ephemeral private key.

Returning to FIG. 4, at 445, method 400 may include, responsive to sending the public key and the signature to the communication partner, clearing the attributes associated with the first random private key that indicate that the first random private key is ephemeral. In this way, this key cannot be used in a different key ephemeral key exchange protocol.

For example, when the original key is generated the ephemeral attribute may be set as true, but if the key is generated through any other means, the ephemeral bit is set as false. This guarantees that the key is truly ephemeral if its attributes indicate so. Then, one or more of the values of the private key or the attributes of associated with the private key that indicate that the private key is ephemeral may be cleared or erased when the key is regenerated following use.

External servers may provision keys into a hardware-based instance based on various policies. Keys can also be provisioned by different services or even from different companies. For example, two separate keys may be provisioned into the same instance, and a need arises to provision a third key into the system, but only if the first two keys were already provisioned.

Figure 5:
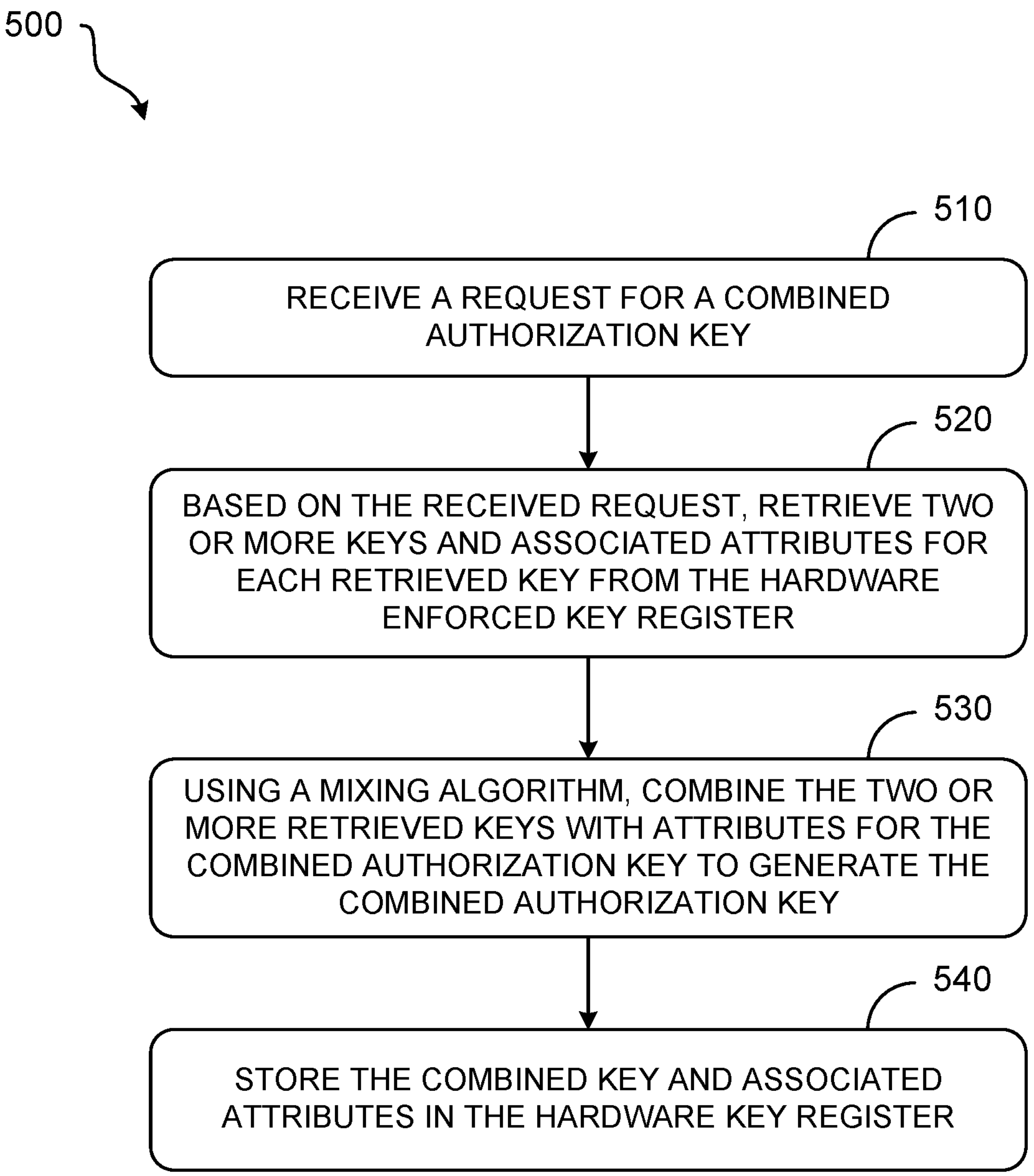
FIG. 5 shows an example method for generating a cryptographic key based on two or more existing cryptographic keys.

FIG. 5 depicts an example method 500 for implementing a hardware enforced key register, such as the registers depicted in FIGS. 1-3. Method 500 may be implemented to establish a new key value and coupled attributes can be established by cryptographically combining two or more existing keys and the attributes for the new key. For example, method 500 may encompass a process that KDFs two keys together into a third key, in a manner where the third key would only be the right value, if the first 2 keys had the right value.

At 510, method 500 includes receiving a request for a combined authorization key. For example, a request may be received from a server at an interface between the exposed circuitry and the ATR circuitry. Such a request may be presented to processing circuitry within ATR circuitry. In some examples, the received request may indicate multi-authorization from different entities associated with each key for the combined authorization key.

At 520, method 500 includes, based on the received request, retrieving two or more keys and associated attributes for each retrieved key from the hardware enforced key register. Each key may occupy its own key slot. In some examples, the retrieved keys may be slotted into different key registers.

In some examples, at least one of the two or more retrieved keys is a subscription key. For example, one or more of the retrieved keys may indicate a subscription to a first on-line service, such as a gaming service. A second of the retrieved keys may indicate a subscription to a second, different on-line service. A new game may be released that normally has a significant activation fee, but is released free to users who subscribe to both the first and second on-line services. Thus only subscribers to both on-line services may derive a combined key and access the new game. In other examples, the keys may be associated with any other suitable computing resource than a subscription-based service.

At 530, method 500 includes, using a mixing algorithm, combining the two or more retrieved keys with attributes for the combined authorization key to generate the combined authorization key. As an example, the mixing algorithm may be a NIST compliant key derivation function (KDF) or any suitable one-way function that does not aid in disclosing the retrieved keys to the exposed circuitry. The associated attributes for each retrieved key may provide permission to combine using the mixing algorithm. In some examples, the attributes for the combined authorization key may be based at least in part on the attributes associated with one or more of the two or more retrieved keys.

In some examples, wherein more than two keys are retrieved for mixing, the mixing algorithm may be applied to two retrieved keys to generate an intermediate authorization key, and wherein the mixing algorithm is applied to the intermediate authorization key and a third retrieved key to generate the combined authorization key. For example, keys 131*a*, 131*b*, and 131*c* may be retrieved. Keys 131*a* and 131*b* may be mixed to generate an intermediate authorization key. Key 131*c* may then be mixed with the intermediate authorization key to generate the combined authorization key. This operation may be repeated for additional keys.

More generically, this allows for Boolean expressions to be used within hardware to determine whether a combined key may be derived or not based on the existing keys that you have. Encryption based on whether one of two keys are present may operate as an (OR) function and encryption based on the presence of two different keys may act as an (AND) function. This enables multi-part requirements to establish which keys need to be available to access certain pieces of information.

At 540, method 500 includes storing the combined key and associated attributes in the hardware key register. The associated attributes for the combined authorization key may be at least in part based on the associated attributes for one or more of the retrieved keys. However, attributes specific to the combined key may also be appended. For example, an attribute indicating that one of the retrieved keys was ephemeral may be cleared. The combined key may be stored directly into a hardware register such that it can be used indirectly based on the allowed policy indicated by the associated attributes. This hardware register may be the same hardware register that holds one or more of the retrieved keys, or may be a different register.

In this way, the need for the external server to redundantly verify both subscriptions and to [AND] the conditions on the server side is eliminated. Upon the receipt and verification of the combined key, the server may prepare a key blob that can only be unwrapped by the combined key to obtain the new content. This helps to guarantee that only users with both subscription keys can derive the combined key, while maintaining this derivation in the ATR circuitry.

Hash-based, or keyed-hash message authentication code (HMAC) is a cryptographic algorithm used in many protocols. It uses a symmetric key to "sign" data resulting in a message authentication code (MAC) value. However, when keys are held in hardware registers, they cannot be used in such a generic manner by the ATR circuitry unless the circuitry can run the desired command natively. For example, performing an HMAC calculation using a symmetric key held in hardware key registers is not possible unless a dedicated HMAC command is added to support this function.

Figure 6:
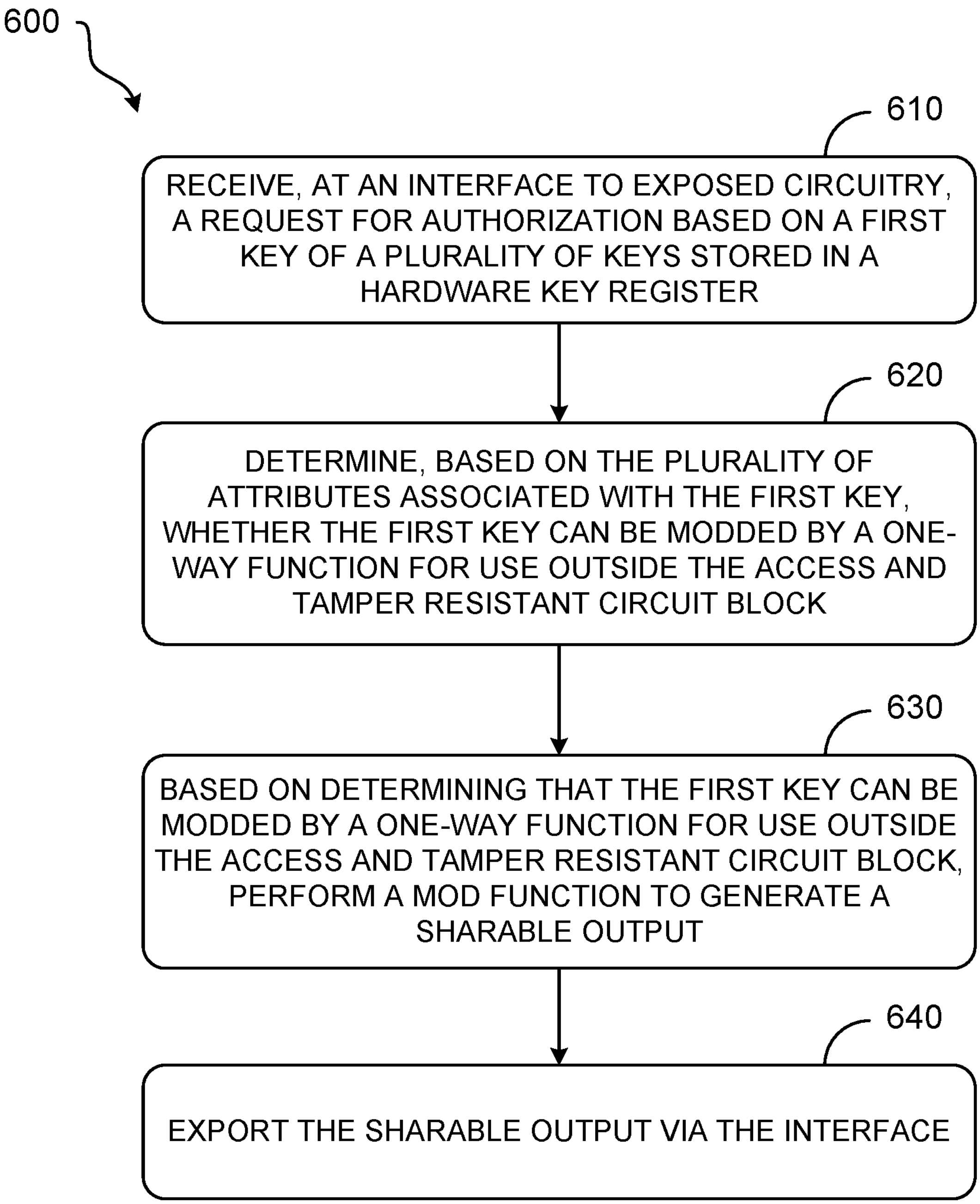
FIG. 6 shows an example method for securely sharing cryptographic keys.

FIG. 6 depicts an example method 600 for a hardware enforced key register, such as the registers depicted in FIGS. 1-3. For example, method 600 may encompass a process whereby hardware carries out a one-way function on a secret key held in a hardware register. The derived value may be provided to exposed circuitry for use as a cryptographically secure key without exposing the underlying key stored in hardware.

At 610, method 600 includes receiving, at an interface between exposed circuitry and ATR circuitry, a request for authorization based on a first key of a plurality of keys. For example, software may desire to use a particular cryptographic algorithm that requires the first key, but the algorithm is not natively implemented by the ATR circuitry.

At 620, method 600 includes, determining, based on the plurality of attributes associated with the first key, whether the first key can be modded by a one-way function for use outside the access and tamper resistant circuitry. In some examples, the one-way function is a keyed-hash, such as an NIST compliant HMAC. In some examples, the attributes that indicate the first key can be modded by a one-way function for use outside the access and tamper resistant circuitry further indicate that the first key is prohibited from being used to derive additional keys for use within the hardware. In other words, if the attribute indicating a key may be used to derive a key that will be presented to exposed circuitry, the key cannot be used to derive other hardware protected keys. As this attribute is set at key generation or derivation, the user may need to plan ahead which keys may need to be used for deriving a sharable output. In this way, security of the key is maintained, as there is no way for the same derivation to occur internally and externally to the ATR circuitry.

At 630, method 600 includes, based on determining that the first key can be modded by a one-way function for use outside the access and tamper resistant circuitry, performing a mod function to generate a sharable output. The one-way function may be securely carried out in the ATR circuitry, so the exposed circuitry has no means to change or observe the calculation or to expose or compromise the value of the first key.

The sharable output may be a message authentication code (MAC), a key, or a hash, and may include novel security properties that allow the exposed circuitry to use the sharable output. The mod function may be based on data provided in the request for authorization.

At 640, method 600 includes exporting the sharable output via the interface. As an example, the sharable output may be used to authenticate a software function that is not natively implemented in the hardware.

Depending on the specific algorithm, the input components, and the associated attributes, the exposed circuitry can then either use this sharable output as cryptographically secure key, use it as a MAC to symmetrically sign things, or as a hash to check integrity. As such, the sharable output is derived from the first key that is never exposed to software. Because the derivation is a one-way function, the exposed circuitry can never gain any information about the first key from the derived sharable output.

As an example, hardware keys may be implemented along the NIST Elliptic-curve cryptography (ECC) curves. The hardware registry may store keys that can support each of these curves. However, associated firmware may want to use a different elliptical curve for cryptography, such as an Edwards curve, that is not implemented in the ATR circuitry. Method 600 allows for the derivation of an appropriate key from a key that is possessed in the hardware registry. This key may be given to firmware—that is, the actual value, not a certificate of possession—so that the firmware can proceed to do cryptography with the Edwards curve without learning anything about the original key.

In another example, a transport layer security (TLS) key exchange may be implemented with another machine. The entirety of the TLS protocol is vast, and not all operations are hardware-supported. By extracting a sharable output from the hardware key register, the remainder of TLS functionality can be implemented in software.

Returning to FIG. 1, ATR circuitry 101 includes Platform Configuration Registers (PCRs) 120. The values stored in PCRs 120 are generated by circuitry internal to ATR circuitry 101 in response to commands received via interface 103. These internally generated PCR values are stored in PCRs 120 and are readable via interface 103 in response to commands received via interface 103. However, the values stored in PCRs 120 are not writable with values received via interface 103 (e.g., values from exposed circuitry 102).

Figure 7:
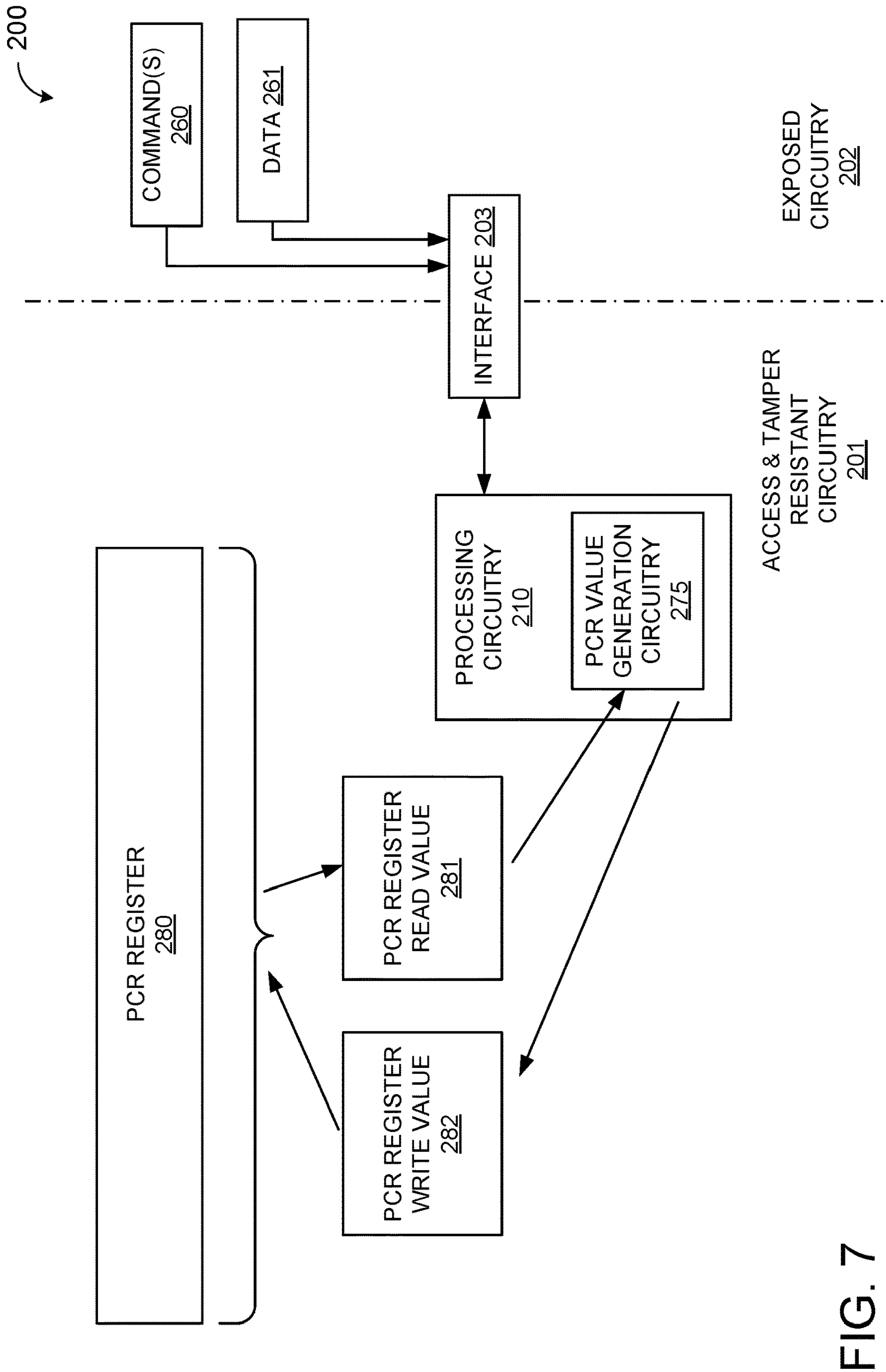
FIG. 7 schematically shows basic operational parameters that may be influenced by key attributes associated with cryptographic keys.

Additional functionality of PCRs is schematically depicted in FIG. 7 as part of cryptographic key management system 200. In FIG. 7, one or more commands 260 (and associated data 261—e.g., an extend value) are provided to interface 203 for provision to processing circuitry 210. In response, processing circuitry 210 reads the contents of PCR register 280 (e.g., PCR read values 281). Using PCR value generation circuitry 275, processing circuitry generates a new PCR write value 282 based on the value 281 read from PCR register 280 and optionally also based on data 261 received via interface 203. In an embodiment, PCR value generation circuitry 275 generates the new value PCR write value 282 to be written to PCR 280 using a Secure Hash Algorithm (e.g., SHA-1, SHA-2, etc.). PCR value generation circuitry 275 may generate the new write value 282 to be written to PCR 280 by hashing a concatenation of the current read value 281 of PCR 280 and data 261. The new write value 282 is written to PCR 280. In some examples, one or more indicators from the attribute portion 231*b* of a key may determine whether processing circuitry 210 will perform the key derivation operation specified by command 260.

In general, PCR values are not secret, but instead are public information that may be readable by the system firmware. Using one-way functions (e.g., sha hash operations), measurements may be stored in each PCR and overwritten as new measurements become available. As such, as input accumulates, a PCR value can be used to indicate the truth of a statement, as the only way it could reach its current value is if a specific series of measurement were recorded in a specific order.

In some systems, all of the initialization values are the same (e.g., 0). Thus, different PCRs may read out the same value at the same time, even when using one-way functions. Ensuring the correct PCR is being used thus involves tracking which measurements are recorded to which PCR. Most PCRs are "static" PCRs that start at a fixed value when the system comes out of reset, and are reset to that value when entire system goes through reset. On the other hand, some systems support "dynamic" PCRs where the PCR can be reset backed to a fixed value again and again depending on whether the "dynamic" event happens or not. Currently, all systems need to pre-determine which PCR registers are static and which are dynamic, and the registers are used for one purpose or the other.

Figure 8:
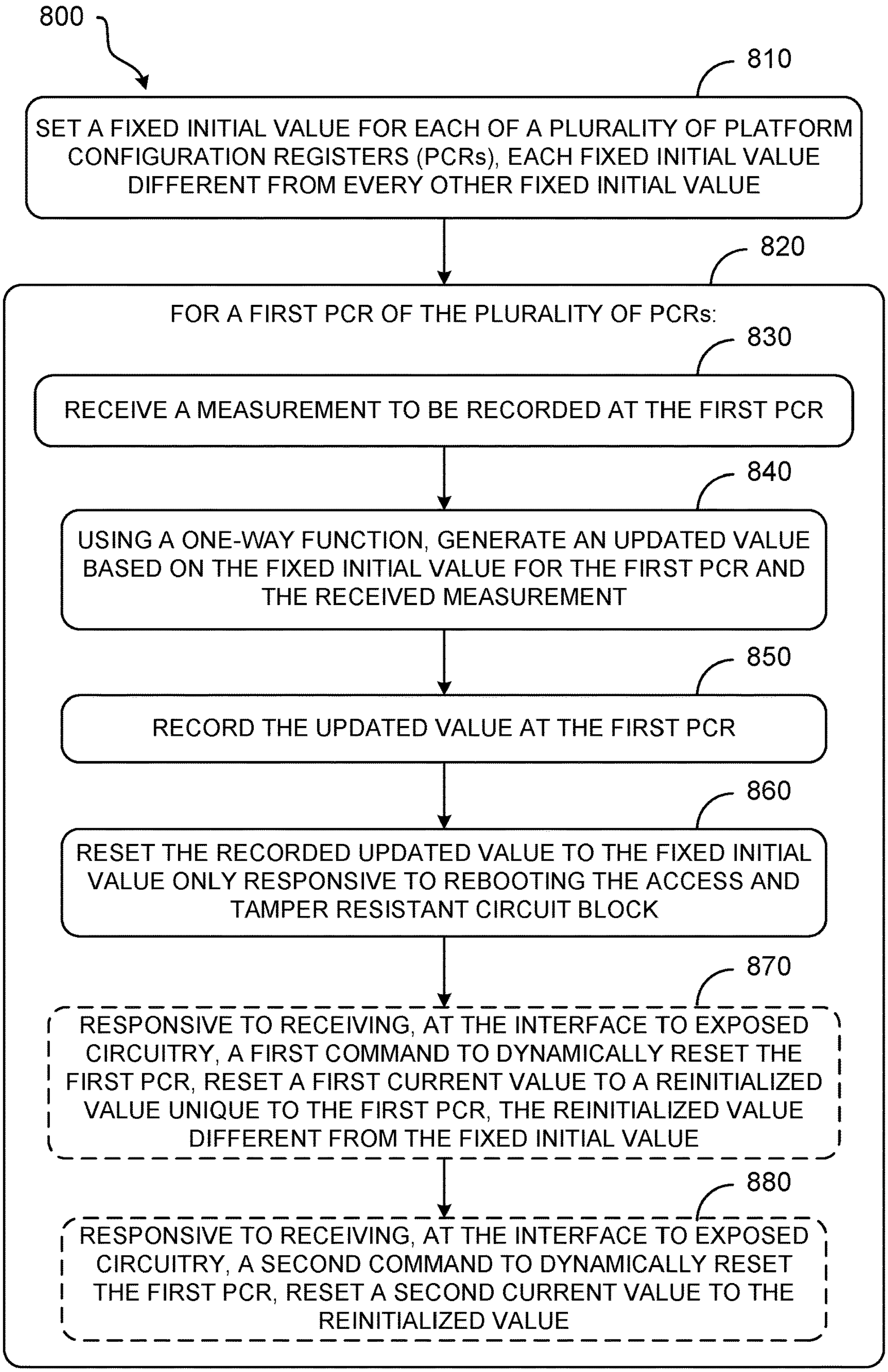
FIG. 8 shows an example method for initializing and reinitializing platform configuration registers.

As such, there is a benefit to distinguishing PCRs based on their initialization values. Further, dynamic PCRs may be easily recognized if their re-initialization values are unique and different from the initialization values for that PCR. FIG. 8 depicts an example method 800 for recording cryptographic measurements via a plurality of platform configuration registers (PCRs). Method 800 may be implemented by processing circuitry for a cryptographic key management system with key attributes, such as processing circuitry 110 and 210.

At 810, method 800 includes setting a fixed initial value for each PCR, each fixed initial value different from every other fixed initial value. For example, the fixed initial value may be based on a slot position of the PCR within the plurality of PCRs (e.g, PCR1=0001; PCR5=0005). In this way, each PCR goes through its own unique sequence, and one PCR cannot be used to represent another PCR. The fixed initial value may be enforced by the ATR circuitry.

Advancing to 820, method 800 includes a number of operations to be performed for a first PCR of the plurality of PCRs. At 830, method 800 includes receiving a measurement to be recorded at the first PCR. For example, data (e.g., data 261) received at the interface of ATR circuitry and exposed circuitry may be recorded at the first PCR. However, some measurements generated within ATR circuitry may also be recorded at the first PCR.

At 840, method 800 includes, using a one-way function, generating an updated value based on the fixed initial value for the first PCR and the received measurement. For example, the one-way function may be a sha hash function. Because each PCR is initialized to a unique number, the one-way function guarantees that the full measurement chain is unique to each PCR. At 850, method 800 includes recording the updated value at the first PCR.

At 860, method 800 includes resetting the recorded updated value to the fixed initial value only responsive to rebooting the access and tamper resistant circuitry. In this way, each PCR is maintained as unique compared to all other PCRs, thus protecting the data stored therewithin.

In cases where a dynamic PCR is desired, such as when an operating system is reconfigured, dynamic reset of the PCR may be supported by setting it to a value that is different than the initial value used when the PCR first came out of reset. This makes it possible to use a PCR for both static measurements as well as dynamic measurements in a manner where whether it is used in a static manner or dynamic manner is indicated by different initial values.

As such, optionally, at 870, method 800 includes responsive to receiving, at the interface to exposed circuitry, a first command to dynamically reset the first PCR, resetting a first current value to a reinitialized value unique to the first PCR, the reinitialized value different from the fixed initial value. In this way, a PCR can be used for both static and dynamic purposes, and the verifier can be certain whether the recorded value at the PCR corresponds to a dynamic measurement or a static measurement.

In some examples, the reinitialized value may be based on a slot position of the PCR within the plurality of PCRs (e.g., PCR1=1001; PCR5=1005). The reinitialized value may be enforced by the access and tamper resistant circuitry and is not alterable by commands received at the interface to exposed circuitry (e.g., by firmware).

Optionally, at 880, method 800 includes responsive to receiving, at the interface to exposed circuitry, a second command to dynamically reset the first PCR, resetting a second current value to the reinitialized value. As such, the software instructing the reinitialization does not get to influence the reinitialization value, outside of commanding which PCR to reset.

In some embodiments, the methods and processes described herein may be tied to a computing system of one or more computing devices. In particular, such methods and processes may be implemented as a computer-application program or service, an application-programming interface (API), a library, and/or other computer-program product.

Figure 9:
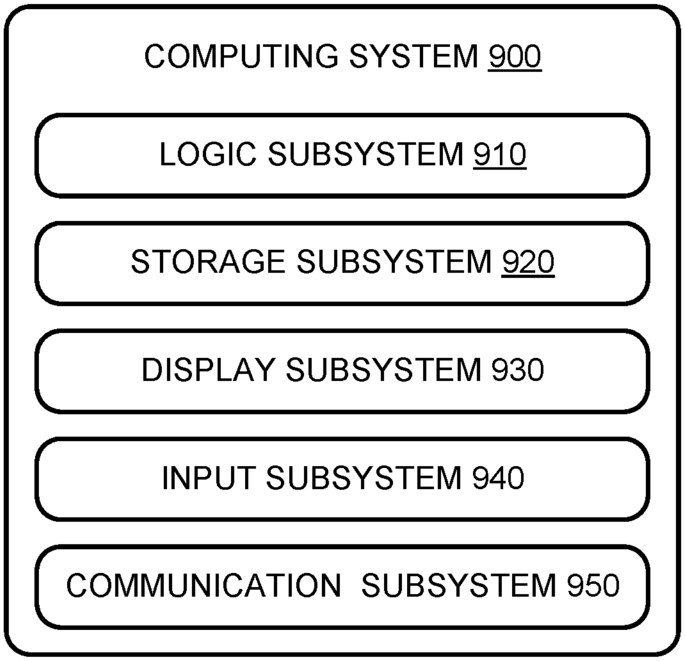
FIG. 9 shows a block diagram of an example computing system.

FIG. 9 schematically shows a non-limiting embodiment of a computing system 900 that can enact one or more of the methods and processes described above. Computing system 900 is shown in simplified form. Computing system 900 may take the form of one or more personal computers, server computers, tablet computers, home-entertainment computers, network computing devices, gaming devices, mobile computing devices, mobile communication devices (e.g., smart phone), and/or other computing devices.

Computing system 900 includes a logic machine 910 and a storage machine 920. Computing system 900 may optionally include a display subsystem 930, input subsystem 940, communication subsystem 950, and/or other components not shown in FIG. 9.

Logic machine 910 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 920 includes one or more physical devices configured to hold instructions executable by the logic machine to implement the methods and processes described herein. When such methods and processes are implemented, the state of storage machine 920 may be transformed—e.g., to hold different data.

Storage machine 920 may include removable and/or built-in devices. Storage machine 920 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 920 may include volatile, nonvolatile, dynamic, static, read/write, read-only, random-access, sequential-access, location-addressable, file-addressable, and/or content-addressable devices.

It will be appreciated that storage machine 920 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 910 and storage machine 920 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms “module,” “program,” and “engine” may be used to describe an aspect of computing system 900 implemented to perform a particular function. In some cases, a module, program, or engine may be instantiated via logic machine 910 executing instructions held by storage machine 920. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms “module,” “program,” and “engine” may encompass individual or groups of executable files, data files, libraries, drivers, scripts, database records, etc.

It will be appreciated that a “service”, as used herein, is an application program executable across multiple user sessions. A service may be available to one or more system components, programs, and/or other services. In some implementations, a service may run on one or more server-computing devices.

When included, display subsystem 930 may be used to present a visual representation of data held by storage machine 920. This visual representation may take the form of a graphical user interface (GUI). As the herein described methods and processes change the data held by the storage machine, and thus transform the state of the storage machine, the state of display subsystem 930 may likewise be transformed to visually represent changes in the underlying data. Display subsystem 930 may include one or more display devices utilizing virtually any type of technology. Such display devices may be combined with logic machine 910 and/or storage machine 920 in a shared enclosure, or such display devices may be peripheral display devices.

When included, input subsystem 940 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 950 may be configured to communicatively couple computing system 900 with one or more other computing devices. Communication subsystem 950 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 950 to send and/or receive messages to and/or from other devices via a network such as the Internet.

In one example, a method for secure key exchange comprises, at an interface between an access and tamper resistant circuit block and exposed circuitry, receiving a request to certify a key from a communication partner; and within the access and tamper resistant circuit block, generating a first random private key; deriving a corresponding public key of the first random private key; generating a cryptographic digest of the public key and attributes associated with the first random private key; using a second random private key, the second random private key designated for signing by one or more associated attributes, signing the generated cryptographic digest; and sending the public key and the signature to the communication partner via the interface. In such an example, or any other example, the attributes associated with the first random private key additionally or alternatively indicate that the first random private key is ephemeral. In any of the preceding examples, or any other example, the method additionally or alternatively comprises, responsive to sending the public key and the signature to the communication partner, clearing the attributes associated with the first random private key that indicate that the first random private key is ephemeral. In any of the preceding examples, or any other example, attributes associated with the second random private key additionally or alternatively indicate that the second random private key is not ephemeral. In any of the preceding examples, or any other example, the public key is additionally or alternatively an Elliptic Curve Diffie Hellman public key. In any of the preceding examples, or any other example, the authenticity of the second random private key is additionally or alternatively established by a certificate. In any of the preceding examples, or any other example, attributes associated with the first random private key additionally or alternatively indicate that the first random private key can be used to derive new values readable outside of the access and tamper resistant circuit block.

In another example, a method for a hardware enforced key register comprises receiving a request for a combined authorization key; based on the received request, retrieving two or more keys and associated attributes for each retrieved key from the hardware enforced key register; using a mixing algorithm, combining the two or more retrieved keys with attributes for the combined authorization key to generate the combined authorization key; and storing the combined authorization key and attributes for the combined authorization key in the hardware key register. In such an example, or any other example, the mixing algorithm is additionally or alternatively a National Institute of Standards and Technology (NIST) compliant key derivation function. In any of the preceding examples, or any other example, the mixing algorithm is additionally or alternatively applied to two retrieved keys to generate an intermediate authorization key, and wherein the mixing algorithm is applied to the intermediate authorization key and a third retrieved key to generate the combined authorization key. In any of the preceding examples, or any other example, at least one of the two or more retrieved keys is additionally or alternatively a subscription key. In any of the preceding examples, or any other example, the received request additionally or alternatively indicates multi-authorization from different entities associated with each key. In any of the preceding examples, or any other example, the associated attributes for each key additionally or alternatively provide permission to combine using the mixing algorithm.

In yet another example, a system for securely sharing cryptographic keys, comprises an access and tamper resistant circuit block, including: an interface to exposed circuitry; a plurality of keys stored in a hardware key register, each key associated with a plurality of attributes; and processing circuitry configured to: receive, at the interface, a request for authorization based on a first key of the plurality of keys; determine, based on the plurality of attributes associated with the first key, whether the first key can be modded by a one-way function for use outside the access and tamper resistant circuit block; based on determining that the first key can be modded by a one-way function for use outside the access and tamper resistant circuit block, performing a mod function to generate a sharable output; and export the sharable output via the interface. In such an example, or any other example, the one-way function is additionally or alternatively a keyed-hash. In any of the preceding examples, or any other example, the request for authorization is additionally or alternatively related to a subscription service. In any of the preceding examples, or any other example, the sharable output is additionally or alternatively a key. In any of the preceding examples, or any other example, the sharable output is additionally or alternatively a digest generated by a cryptographic hash function. In any of the preceding examples, or any other example, the sharable output is additionally or alternatively used to authenticate a software function that is not natively implemented in the hardware. In any of the preceding examples, or any other example, the attributes that indicate the first key can be modded by a one-way function for use outside the access and tamper resistant circuit block additionally or alternatively indicate that the first key is prohibited from being used to derive additional keys for use within the hardware.

In a further example, a system for recording cryptographic measurements comprises an access and tamper resistant circuit block, including: an interface to exposed circuitry; a plurality of platform configuration registers (PCRs); and processing circuitry configured to: set a fixed initial value for each PCR, each fixed initial value different from every other fixed initial value; and for a first PCR of the plurality of PCRs: receive a measurement to be recorded at the first PCR; using a one-way function, generate an updated value based on the fixed initial value for the first PCR and the received measurement; record the updated value at the first PCR; and reset the recorded updated value to the fixed initial value only responsive to rebooting the access and tamper resistant circuit block. In such an example, or any other example, the processing circuitry is additionally or alternatively configured to: responsive to receiving, at the interface to exposed circuitry, a first command to dynamically reset the first PCR, reset a first current value to a reinitialized value unique to the first PCR, the reinitialized value different from the fixed initial value. In any of the preceding examples, or any other example, the processing circuitry is additionally or alternatively configured to: responsive to receiving, at the interface to exposed circuitry, a second command to dynamically reset the first PCR, reset a second current value to the reinitialized value. In any of the preceding examples, or any other example, the reinitialized value is additionally or alternatively based on a slot position of the PCR within the plurality of PCRs. In any of the preceding examples, or any other example the reinitialized value is additionally or alternatively enforced by the access and tamper resistant circuit block and is not alterable by commands received at the interface to exposed circuitry. In any of the preceding examples, or any other example, the fixed Initial value is additionally or alternatively based on a slot position of the PCR within the plurality of PCRs. In any of the preceding examples, or any other example the one-way function is additionally or alternatively a sha hash function. In any of the preceding examples, or any other example the fixed initial value is additionally or alternatively enforced by the access and tamper resistant circuit block.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for a hardware enforced key register, comprising:

at an interface between an access and tamper resistant circuit block and exposed circuitry, receiving, from an external server, a request for a combined authorization key; and within the access and tamper resistant circuit block:

based on the received request, retrieving two or more keys from key portions of the hardware enforced key register, each retrieved key generated within the access and tamper resistant circuit block, and retrieving associated key attributes for each retrieved key from attribute portions of the hardware enforced key register, each key attribute encoding one or more designated operations that can be performed on the retrieved key associated with the key attribute, wherein contents of the key portions of the hardware enforced key register are not readable in unencrypted form, and wherein contents of the attribute portions of the hardware enforced key register are readable in unencrypted form;

using a mixing algorithm, combining the two or more retrieved keys with attributes for the combined authorization key to generate the combined authorization key, wherein the associated key attributes for each key provide permission to combine using the mixing algorithm; and storing the combined authorization key and associated key attributes for the combined authorization key in the hardware enforced key register.

2. The method of claim 1, wherein the mixing algorithm is a National Institute of Standards and Technology (NIST) compliant key derivation function.

3. The method of claim 2, wherein the mixing algorithm is applied to two retrieved keys to generate an intermediate authorization key, and wherein the mixing algorithm is applied to the intermediate authorization key and a third retrieved key to generate the combined authorization key.

4. The method of claim 1, wherein at least one of the two or more retrieved keys is provisioned based on a valid subscription to a subscription based service.

5. The method of claim 1 wherein the received request is generated in response to a request to certify multi-authorization from different external entities associated with each key.

6. The method of claim 1, wherein the associated key attributes for the combined authorization key are based at least in part on the associated key attributes for one or more of the two or more retrieved keys.

7. The method of claim 1, wherein the associated key attributes for the combined authorization key are specific to the combined authorization key.

8. A system comprising:

a processor;

memory storing instructions that, when executed, cause operations comprising:

receiving, from an external server and at an interface between an access and tamper resistant circuit block and exposed circuitry, a request for a combined authorization key; and within the access and tamper resistant circuit block:

based on the received request, retrieving two or more keys from key portions of a hardware enforced key register, each retrieved key generated within the access and tamper resistant circuit block, and retrieving associated key attributes for each retrieved key from attribute portions of the hardware enforced key register, each key attribute encoding one or more designated operations that can be performed on the retrieved key associated with the key attribute, wherein contents of the key portions of the hardware enforced key register are not readable in unencrypted form, and wherein contents of the attribute portions of the hardware enforced key register are readable in unencrypted form;

using a mixing algorithm, combining the two or more retrieved keys with attributes for the combined authorization key to generate the combined authorization key, wherein the associated key attributes for each key provide permission to combine using the mixing algorithm; and storing the combined authorization key and associated key attributes for the combined authorization key in the hardware enforced key register.

9. The system of claim 8, wherein the mixing algorithm is a National Institute of Standards and Technology (NIST) compliant key derivation function.

10. The system of claim 9, wherein the mixing algorithm is applied to two retrieved keys to generate an intermediate authorization key, and wherein the mixing algorithm is applied to the intermediate authorization key and a third retrieved key to generate the combined authorization key.

11. The system of claim 8, wherein at least one of the two or more retrieved keys is provisioned based on a valid subscription to a subscription based service.

12. The system of claim 8, wherein the received request is generated in response to a request to certify multi-authorization from different external entities associated with each key.

13. The system of claim 8, wherein the associated key attributes for the combined authorization key are based at least in part on the associated key attributes for one or more of the two or more retrieved keys.

14. The system of claim 8, wherein the associated key attributes for the combined authorization key are specific to the combined authorization key.

15. A device comprising:

an interface between an access and tamper resistant circuit block and exposed circuitry; and memory storing instructions that, when executed, cause operations comprising:

receiving, at the interface and from an external server, a request for a combined authorization key; and within the access and tamper resistant circuit block:

based on the received request, retrieving two or more keys from key portions of a hardware enforced key register, each retrieved key generated within the access and tamper resistant circuit block, and retrieving associated key attributes for each retrieved key from attribute portions of the hardware enforced key register, each key attribute encoding one or more designated operations that can be performed on the retrieved key associated with the key attribute, wherein contents of the key portions of the hardware enforced key register are not readable in unencrypted form, and wherein contents of the attribute portions of the hardware enforced key register are readable in unencrypted form;

using a mixing algorithm, combining the two or more retrieved keys with attributes for the combined authorization key to generate the combined authorization key, wherein the associated key attributes for each key provide permission to combine using the mixing algorithm; and storing the combined authorization key and associated key attributes for the combined authorization key in the hardware enforced key register.

16. The device of claim 15, wherein the mixing algorithm is a National Institute of Standards and Technology (NIST) compliant key derivation function.

17. The device of claim 16, wherein the mixing algorithm is applied to two retrieved keys to generate an intermediate authorization key, and wherein the mixing algorithm is applied to the intermediate authorization key and a third retrieved key to generate the combined authorization key.

18. The device of claim 15, wherein at least one of the two or more retrieved keys is provisioned based on a valid subscription to a subscription based service.

19. The device of claim 15, wherein the received request is generated in response to a request to certify multi-authorization from different external entities associated with each key.

20. The device of claim 15, wherein the associated key attributes for the combined authorization key are based at least in part on the associated key attributes for one or more of the two or more retrieved keys.

* * * * *